Rudolph L. Kuehn
Clarence J. Munsey
INVENTORS

Rudolph L. Kuehn
Clarence J. Munsey
INVENTORS

Rudolph L. Kuehn
Clarence J. Munsey
INVENTORS

United States Patent Office 2,863,055
Patented Dec. 2, 1958

2,863,055
SWEEP GENERATOR

Rudolph L. Kuehn, Pasadena, and Clarence J. Munsey, Whittier, Calif., assignors to Hycon Mfg. Company, Pasadena, Calif., a corporation of Delaware Application July 11, 1956, Serial No. 597,238

17 Claims. (Cl. 250—27)

The present invention relates generally to sawtooth voltage generators and more particularly to an automatically triggered sweep generator.

The internal sweep generator of an oscilloscope, for example, can be either astable (free-running) and synchronized by various generated signals, or it can be monostable (one-shot) and be triggered by incoming signals. The latter mode of operation is highly desirable since it ensures positive synchronization with less tendency to jitter and is exclusively used in the analysis of transient and pulse phenomena. In the absence of signal, however, the monostable generator exhibits no output and hence no trace is visible on the face of the oscilloscope cathode ray tube.

It is an object of this invention to provide a sweep generator that operates in a monostable mode in the presence of signals and which automatically restores to astable condition in the absence of incoming signals.

Another object of the invention is to provide a sweep generator which is capable of expanding a signal pulse display.

Another object of the invention is to provide a sweep generator which can be automatically triggered for a variety of input signals, including high frequency sine waves.

A further object of this invention is to provide a sweep generator in which a relay need not be employed for auto sweep control.

Briefly, the foregoing and other objects are preferably accomplished by providing a sweep generator having an auto sweep channel and a synchronizing channel, the auto sweep channel including means operatively responsive to incoming signals to place a normally astable operating gate generator in monostable operating condition. A trigger signal appearing in the synchronizing channel is coupled to trigger the gate generator, the operation of which controls the operation of a sawtooth generator which produces the sweep output signal. The auto sweep channel can be turned off, in which instance the gate generator operates in monostable mode and an output sawtooth is obtained from the sawtooth generator only upon triggering of the gate generator.

This invention possesses other objects and features, some of which together with the foregoing, will be set forth in the following description of a preferred embodiment of the invention, and the invention will be more fully understood by reference to the attached drawings, in which.

Figure 1:
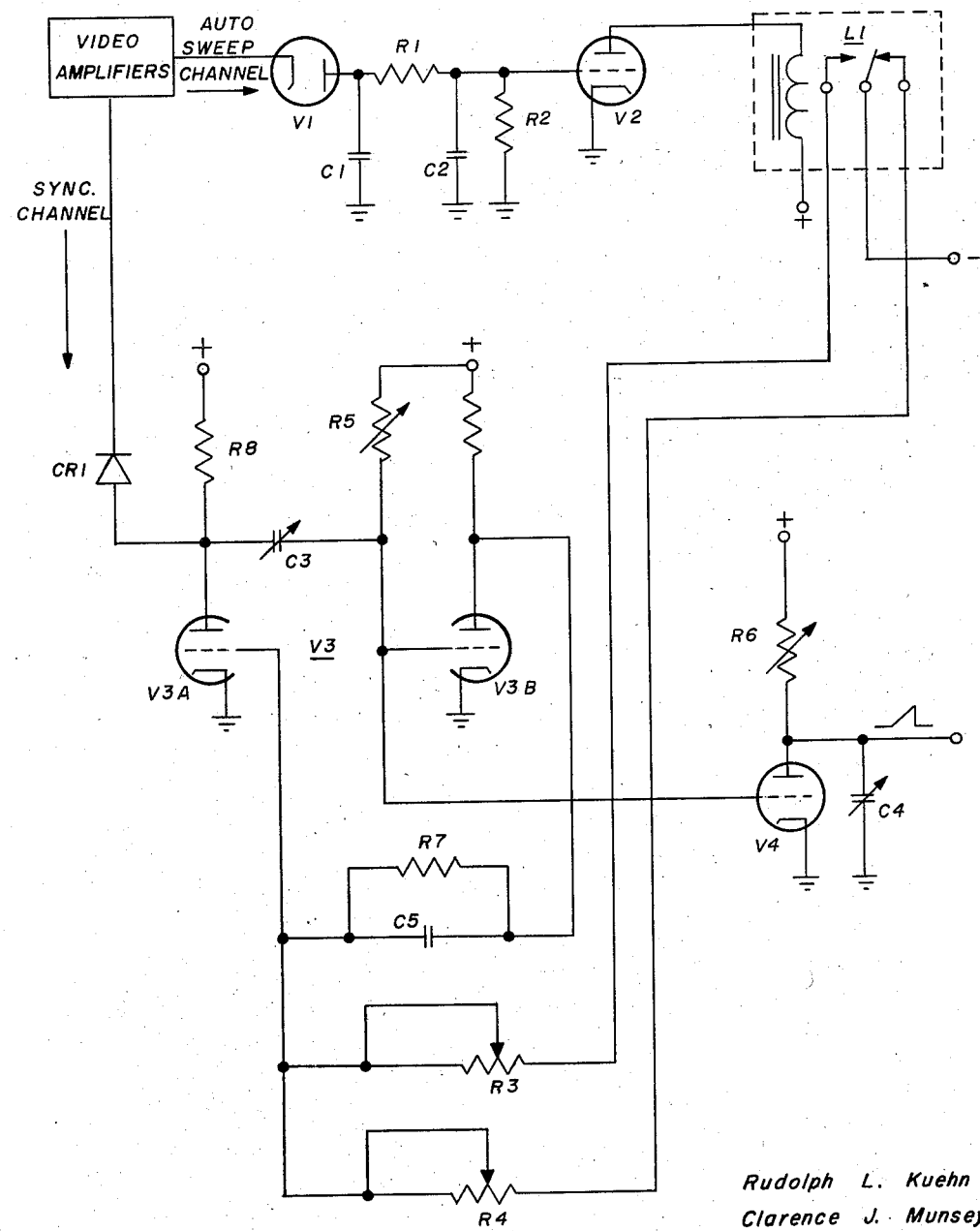
Figure 1 is a schematic wiring diagram of a generally basic form of the invention.

The invention is shown in a generally fundamental form in Figure 1. In this figure, a signal is obtained from the video amplifiers (shown in block form) of an oscilloscope, for example, in a manner similar to that used for deriving synchronizing information. This signal is supplied to an auto sweep channel and is initially applied to a rectifier V1 which rectifies the signal. The rectified signal is then filtered by a conventional filter comprising parallel capacitors C1 and C2, and series resistor R1. A negative voltage is produced across resistor R2 and is applied to the control grid of a normally conducting tube V2, cutting off V2. Relay L1 is thereby de-energized and the relay pole assumes the position shown.

The negative bias on the relay pole is thus disconnected from adjustable resistor R3 and applied to the control grid of tube V2A through adjustable resistor R4. Tubes V3A and V3B are connected as a gate generator V3 which is biased to operate in astable mode by the setting of resistor R3, or is biased to operate in a monostable mode by the setting of resistor R4. The gate generator V3 is thus placed in monostable operating condition when relay L1 is de-energized and can be triggered by a synchronizing channel signal transmitted through a rectifier CR1 connected to the anode of V3A as shown. The value of resistor R3 is adjusted for astable operation of the gate generator V3 with no signal in either the auto sweep channel or the synchronizing channel. The resistor R4, however, is adjusted for monostable operation with signal present in the auto channel but with the synchronizing channel turned off (circuit opened, for example).

Normally, there is no signal in the auto sweep channel and relay L1 is energized so that a negative bias is supplied through resistor R3, placing the gate generator V3 in astable operating mode. For astable operation, capacitor C3 (assumed charged) is gradually discharged through resistor R5 when tube V3A is conducting. At the same time, the potential on the control grid of tube V3B and on the control grid of sweep generator V4 gradually rises to a level where V3B and V4 will conduct. Simultaneously therewith, capacitor C4 is also charged through load resistor R6 to produce the rising slope of a sawtooth voltage. Tube V3B conducts when its control grid potential is raised above cut off by the voltage on the capacitor C3. The tube V3A is, in turn, cut off when V3B conducts, the drop in plate voltage of V3B being applied to the control grid of V3A through a parallel network consisting of capacitor C5 and resistor R7. Sweep generator V4 similarly conducts when V3B does, because of the rise in control grid potential due to a parallel connection with the control grid of V3B. Capacitor C3 is rapidly re-charged through resistor R8 when V3B and V4 conduct. At the same time, capacitor C4 also rapidly discharges through tube V4 to produce the sharp drop of the sawtooth output. The cycle is repeated with the cut off of tubes V3B and V4, when the potential on the control grids of V3B and V4 due to the re-charging of capacitor C3 increases negatively below cut off level, and capacitors C3 and C4 again are gradually discharged and charged, respectively, through resistors R5 and R6. C3 and R5 can be adjusted to vary the frequency of the gate generator V3, and adjustment of C4 and R6 can vary the sawtooth charge time.

When relay L1 is de-energized, bias is provided through resistor R4 such that the gate generator V3 is placed in a monostable operating condition. The tube V3A is biased to be normally non-conducting. Tubes V3B and V4 are then both conducting and a low output is obtained from the plate V4. The low plate voltage of conducting tube V3B is further applied to the control grid of tube V3A to keep V3A cut off. The capacitor C3 has been fully charged through resistor R8 and the conducting tube V3B, but not sufficiently to affect either tubes V3B or V4, because of the negative controlling bias on the control grid of tube V3A.

The gate generator V3 can be triggered by a signal appearing in the synchronizing channel which supplies a negative voltage through the rectifier CR1 to the plate of tube V3A. This negative voltage is coupled by capacitor C3 to the grids of V3B and V4. Since V3A is not conducting, the negative voltage does not affect it, but V3B is cut off by the negative signal. The attendant rise in plate potential of V3B is applied to the control grid of V3A through the parallel combination of capacitor C5 and resistor R7 which causes V3A to conduct. Thus, capacitor C3, which has been charged through resistor R8 and the conducting tube V3B, is now being discharged slowly through resistor R5 and conducting tube V3A, until the negative voltage of capacitor C3 on the control grid of V3B is reduced to the point where V3B, and V4, can conduct.

During the slow discharge of C3 which negative voltage keeps V3B and V4 cut off, the capacitor C4 is gradually charged through resistor R6 to form the rising portion of the output sawtooth waveform. Conduction of V4, however, permits capacitor C4 to discharge rapidly through conducting tube V4, producing the sharp drop forming the sawtooth output. The conduction of V3B also causes the non-conduction of V3A by applying the negative plate drop to the control grid of V3A through C5 and R7. The capacitor C3 is again charged through resistor R8 and conducting tube V3B, repeating the cycle.

Figure 2:
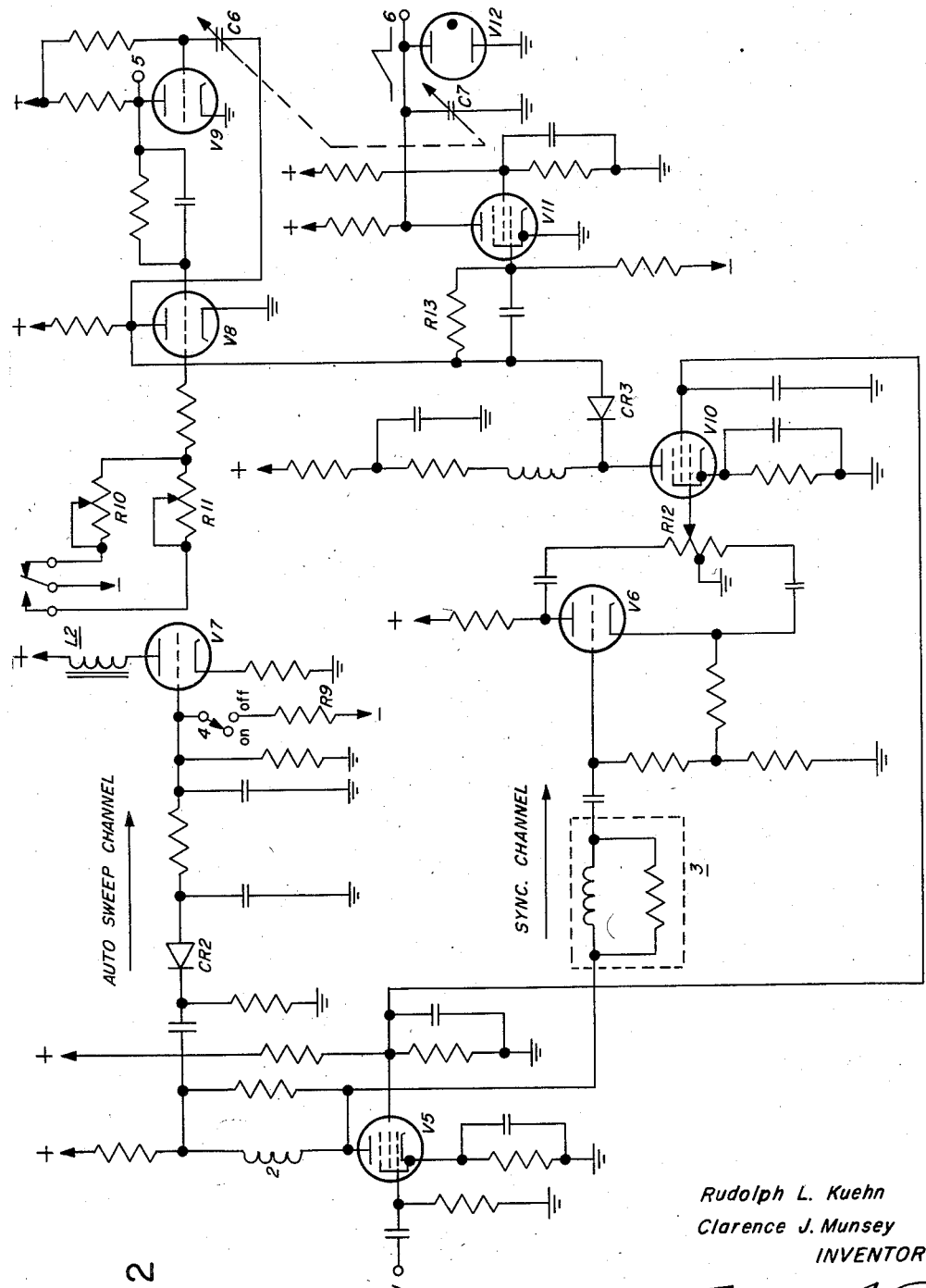
Figure 2 is a schematic wiring diagram of a preferred embodiment of the invention following the circuit illustrated in Figure 1.

The circuit described in Figure 1 can be generally incorporated in an oscilloscope sweep generator as shown in Figure 2. Vertical input signals or external synchronizing signals can be applied to an input terminal 1. Input terminal 1 is conventionally coupled to amplifier V5 having a peaking coil 2 in its plate circuit to increase high frequency response of the amplifier. An output from the plate of V5 is fed through a frequency compensating network 3 to the control grid of a conventional paraphase amplifier V6. This is the synchronizing channel as designated in Figure 1. The amplifiers in the synchronizing channel are compensated in order that sufficient triggering voltage is available to operate the instrument in triggered mode with sine wave inputs as high in frequency as 5 megacycles. The corresponding auto sweep channel carries the uncompensated portion of the signal taken from the plate circuit of V5. The auto sweep channel includes a rectifier detector CR2 followed by a network connecting with auto sweep control tube V7. The connecting network is similar to that shown in Figure 1 but including, additionally, a switch 4 connected to a fixed negative bias through a resistor R9. By closing the switch 4 and applying the fixed negative bias through resistor R9 on the control grid of V7, the tube V7 is kept non-conducting such that relay L2 is not energized, and the relay pole assumes and maintains the position shown.

A negative voltage supply can be connected through the relay pole to either adjustable resistor R10 or resistor R11. The setting of resistor R10 is adjusted for monostable operation of a gate generator comprising tubes V8 and V9 which are connected in a multivibrator configuration as shown. Resistor R11, however is adjusted for a bias which causes astable operation of the gate generator. An output on terminal 5 of the gate generator is obtained from the plate of V9 and supplies a blanking signal to the control grid of a cathode ray tube during the time that V9 is conducting and the plate potential of V9 is low.

The output from paraphase amplifier V6 is obtained from a center-tap grounded potentiometer R12 which provides phase and output level adjustment. This output is fed to amplifier V10 and the output of V10 is coupled through a series diode CR3 to provide negative trigger signals to the gate generator which, in turn, controls a sawtooth generator V11 which produces the sawtooth output voltage on output terminal 6. The frequency of the gate generator (multivibrator) and the charge time of the sawtooth generator V11 can be controlled by adjustable capacitors C6 and C7, respectively.

The sawtooth generator V11 is controlled by an output obtained from the plate of tube V8 which is fed to the negatively biased control grid of V11 through resistor R13. The negative and then positive non-sinusoidal waveform applied to the control grid of V11 cuts off V11 during the negative part of the output from V8. The capacitor C7 then charges toward plate voltage. As the control grid of V11 goes positive, the plate voltage drops and the plate capacitor C7 immediately discharges through the tube V11. The resulting sawtooth output from terminal 6 can be fed to a cathode follower (not shown) and the sweep signal is taken from a circuit clamped by a silicon diode connected across the cathode load resistor of the cathode follower. A small neon glow tube V12 limits the plate of V11 from rising too high when the instrument is first turned on, protecting the timing capacitor C7.

Tube V7 is the automatic sweep control tube. When switch 4 is placed in the on position and no external synchronizing signal, for example, is applied to amplifier V5 through input terminal 1, tube V7 conducts through the coil of relay L2 and the pole is actuated to provide bias through resistor R11 to the control grid of V8, which places the gate generator in astable operation. Thus, the gate generator applies a signal to the sweep generator V11 and sweeps the scope, even though no synchronizing input signal is present on terminal 1. It is to be noted that the synchronizing input signal can be obtained either from an external "vertical" signal or external "sync" signal.

When a synchronizing signal is present, negative bias developed by rectifier CR2 is applied to V7 which is then cut off. The relay pole assumes the position shown and the negative bias obtained through resistor R10 applied to the control grid of V8 places the gate generator in a monostable or triggered condition. The incoming synchronizing signal then triggers the gate generator and the oscilloscope goes automatically into conventional triggered or driven operation. Sine waves about 5 megacycles, for example, will not automatically switch the sweep generator to triggered mode, but stationary patterns are still obtained because the gate generator still synchronizes when running recurrently (astable operation). Input pulses which, for example, are being observed can be magnified by increasing the sweep frequency, independently of pulse input frequency. This increases the slope of the sawtooth output which is triggered by the leading edge of a pulse.

Figure 3:
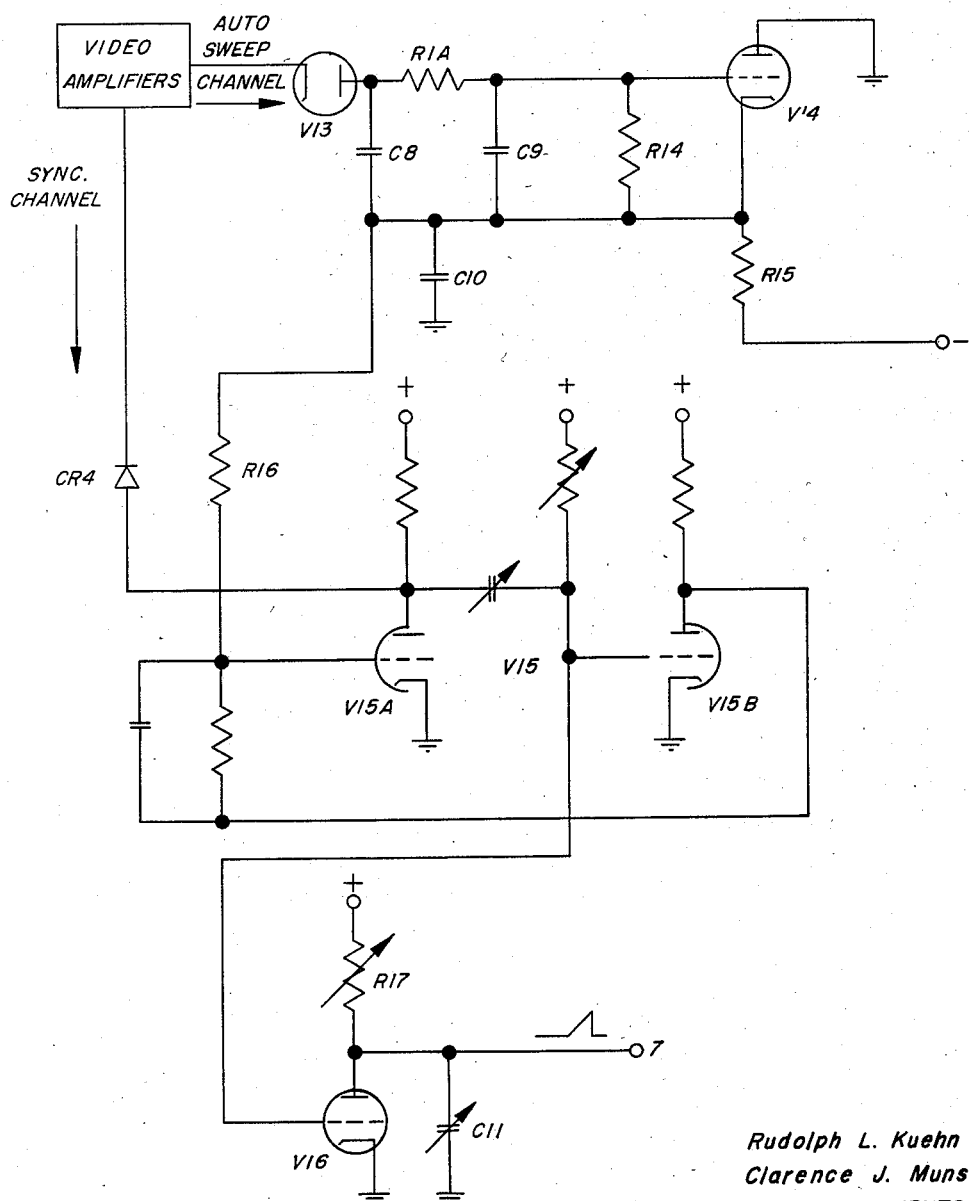
Figure 3 is a schematic wiring diagram of another version of the invention, not requiring the use of a relay.

Another version of the invention is illustrated in Figure 3. A relay is not used in this circuit, but the functioning of the circuit is substantially the same. The auto sweep channel includes a rectifier V13 similar to V1 in Figure 1, and is used to rectify a signal obtained from the video amplifiers (shown in block form) of, for example, an oscilloscope, as before. The rectified signal is then filtered by the filter comprising C8, C9 and R1A, connected as shown, and the negative signal appearing across resistor R14 is applied to the control grid of tube V14. A capacitor C10 is connected to C8 and C9 to ground, to provide an A. C. return for the rectifier V13. The plate V14 is connected to ground and the cathode to a negative supply through cathode resistor R15. The cathode of V14 is further connected through resistor R16 to the control grid of a tube V15A which, together with tube V15B, are connected in the form of a gate generator V15. The gate generator V15 is the same as the one shown in Figure 1, wherein the control grid of tube V15B is connected to the control grid of a sawtooth generator V16 having a plate load resistor R17 and output capacitor C11. A sawtooth output signal is obtained on output terminal 7 as before.

When a signal appears in the auto sweep channel, tube V14 is cut off by the negative signal produced at the control grid. The cathode of V14 is then at the potential of the negative supply and, through resistor R16, holds the gate generator V15 in a cut off or monostable condition in which V15A is normally non-conducting. A negative synchronizing channel signal is obtained through rectifier CR4 and is applied to the plate of tube V15A to trigger the gate generator V15 in the manner described previously for Figure 1. In the absence of signal in the auto sweep channel, V14 conducts, raising its cathode to nearly ground potential such that the control grid of V15A is returned to a low bias and astable operation.

It is clear that the gate generators and the sawtooth generators described above are not restricted to any particular configuration or type, and that the invention is applicable with any gate generator capable of assuming the two operating modes, astable, and monostable. Further, the grid return of either the auto sweep channel control tube (V2 and V14) or the grid return of the gate generator can be connected to a fixed bias potential set to whatever operating mode is desired, and not be influenced by signal conditions. Other methods of obtaining signal derived bias can be utilized in conjunction with any switching means and any gate generator operable in either astable or monostable modes.

We have now described certain present preferred embodiments of our invention. It will be understood, however, that various modifications will occur to those skilled in the art and may be made without departing from the spirit and scope of the invention as defined by the broader of the appended claims.

We claim:

1. A sweep generator, comprising: means forming an auto sweep channel and a synchronizing channel; means for deriving a control signal respectively for each said channels from an input signal to be observed; a gate generator capable of astable and monostable operation connected to said auto sweep channel, said gate generator being responsive in astable operation for one condition of the auto sweep channel control signal and in monostable operation for another condition of the auto sweep channel control signal; means connecting said synchronizing channel to said gate generator, said gate generator being triggerable in monostable operation by the synchronizing channel control signal; and output means operatively responsive to each operation cycle of said gate generator for forming a sweep control output signal.

2. The invention according to claim 1 in which said auto sweep channel includes a relay operably responsive to the condition of said auto sweep channel control signal for connecting an astable bias to said gate generator for one condition of said auto sweep channel control signal, and connecting a monostable bias to said gate generator for another condition of said auto sweep channel control signal.

3. The invention according to claim 1 in which said auto sweep channel includes an electron tube operatively responsive to the condition of said auto sweep channel control signal for varying an astable bias applied to said gate generator for one condition of said auto sweep channel control signal to a monostable bias for another condition of said auto sweep channel control signal.

4. The invention according to claim 1 in which said gate generator includes a pair of electron tubes connected as a multivibrator.

5. The invention according to claim 1 in which said output means include an electron tube having an output capacitor connected across said tube for providing a sweep signal output.

6. The invention according to claim 1 in which said means for deriving control signals include a video amplifier having outputs connected respectively to said auto sweep channel and said synchronizing channel.

7. The invention according to claim 1 in which said auto sweep channel includes means for maintaining the auto sweep channel control signal in one condition irrespective of changes in said input signal.

8. The invention according to claim 1 in which said connecting means include a rectifier oriented to provide negative trigger signals to said gate generator.

9. A sweep generator, comprising: means forming an auto sweep channel; means forming a synchronizing channel; means for deriving a control signal respectively for each said channels from an input signal; a gate multivibrator capable of astable and monostable operation connected to said auto sweep channel, said gate multivibrator connected to respond in astable operation for one condition of the auto sweep channel control signal and in monostable operation of another condition of the auto sweep channel control signal; means connecting said synchronizing channel to said gate multivibrator, said gate multivibrator being triggerable in monostable operation by the synchronizing channel control signal; and an output signal generator operatively responsive to each operation cycle of said gate multivibrator for forming a sweep control output signal.

10. The invention according to claim 9 in which said auto sweep channel includes a rectifier, a filter connected to said rectifier, an electron tube having a control grid and cathode connected to the output of said filter, and a relay connected to the output of said electron tube, said relay connecting an astable bias to said gate multivibrator for a cut off condition of said electron tube and operated to connect a monostable bias to said gate multivibrator for a conducting condition of said electron tube.

11. The invention according to claim 9 in which said auto sweep channel includes a rectifier, a filter connected to said rectifier, an electron tube having a control grid and cathode connected to the output of said filter, means connecting a negative bias to the cathode of said electron tube, and means connecting said cathode to control said gate multivibrator, said negative bias conditioning said gate multivibrator to monostable operation for non-conduction of said electron tube and to astable operation for conduction of said electron tube.

12. The invention according to claim 9 in which said connecting means include a rectifier oriented to provide negative trigger signals to said gate multivibrator.

13. The invention according to claim 9 in which said output signal generator comprises an electron tube having an output capacitor connected across said tube for providing a sweep signal output.

14. The invention according to claim 9 in which said means for deriving control signals include a video amplifier having outputs connected respectively to said auto sweep channel and said synchronizing channel.

15. The invention according to claim 9 in which said auto sweep channel includes means for maintaining the auto sweep channel control signal in one condition irrespective of changes in said input signal.

16. The invention according to claim 9 in which said synchronizing channel includes a frequency compensating network.

17. The invention according to claim 9 in which said synchronizing channel includes a paraphase amplifier for providing phase and level adjustment of the synchronizing channel control signal.

References Cited in the file of this patent

UNITED STATES PATENTS

| | | |
|---|---|---|
| 2,491,804 | Fleming et al. | Dec. 20, 1949 |
| 2,511,093 | Atwood et al. | June 13, 1950 |
| 2,537,065 | Lester et al. | Jan. 9, 1951 |
| 2,562,530 | Dickinson | July 31, 1951 |
| 2,677,122 | Gardner | Apr. 27, 1954 |
| 2,727,144 | Leyde et al. | Dec. 13, 1955 |